(12) United States Patent
Kautzky et al.

(10) Patent No.: US 9,129,626 B2
(45) Date of Patent: Sep. 8, 2015

(54) NEAR-FIELD TRANSDUCER WITH ROUNDED OR OBTUSE CORNERS

(71) Applicant: Seagate Technology LLC, Cupertino, CA (US)

(72) Inventors: Michael Christopher Kautzky, Eagan, MN (US); James Gary Wessel, Savage, MN (US); Mark Ostrowski, Lakeville, MN (US); Tae-Woo Lee, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 14 days.

(21) Appl. No.: 14/061,934

(22) Filed: Oct. 24, 2013

(65) Prior Publication Data

US 2015/0117169 A1    Apr. 30, 2015

(51) Int. Cl.
*G11B 11/00* (2006.01)
*G11B 5/48* (2006.01)
*G11B 13/08* (2006.01)
*G11B 5/31* (2006.01)
*G11B 5/60* (2006.01)
*G11B 5/00* (2006.01)
*G11B 7/12* (2012.01)

(52) U.S. Cl.
CPC ............. *G11B 5/4866* (2013.01); *G11B 5/314* (2013.01); *G11B 5/6088* (2013.01); *G11B 13/08* (2013.01); *G11B 7/1206* (2013.01); *G11B 2005/0021* (2013.01)

(58) Field of Classification Search
CPC ........................ G11B 5/4866; G11B 2005/0021; G11B 5/314; G11B 5/6088; G11B 2005/001; G11B 7/1387; G11B 3/045; G11B 5/3133; G11B 5/3163; G11B 13/08; G11B 7/1384; G11B 5/1871
USPC ........... 369/13.33, 13.32, 13.24, 13.14, 13.03, 369/13.02, 13.12, 112.27, 13.13, 13.01; 360/59, 125.31, 125.74
See application file for complete search history.

(56) References Cited

U.S. PATENT DOCUMENTS

| | | |
|---|---|---|
| 7,894,308 B2 | 2/2011 | Peng et al. |
| 8,159,769 B2 | 4/2012 | Batra et al. |
| 8,223,611 B2 | 7/2012 | Tanaka et al. |
| 8,286,329 B1 | 10/2012 | Zhao et al. |
| 8,320,219 B1 * | 11/2012 | Wolf et al. .................. 369/13.33 |
| 8,325,569 B1 | 12/2012 | Shi et al. |
| 8,343,364 B1 | 1/2013 | Gao et al. |
| 8,351,307 B1 | 1/2013 | Wolf et al. |
| 8,385,159 B2 | 2/2013 | Gao et al. |
| 8,391,108 B2 | 3/2013 | Peng et al. |

(Continued)

FOREIGN PATENT DOCUMENTS

CN    102479516    5/2012

*Primary Examiner* — Ali Neyzari
(74) *Attorney, Agent, or Firm* — Hollingsworth Davis, LLC

(57) ABSTRACT

Embodiments are directed to an apparatus having an air-bearing surface that is configured to interact with magnetic medium. The apparatus includes a waveguide and a plasmonic near-field transducer positioned at or near the air-bearing surface. The plasmonic near-field transducer is operatively coupled to the waveguide. The plasmonic near-field transducer includes an enlarged region and a peg region. The peg region extends from the enlarged region towards the air-bearing surface. The peg region has at least a portion of a periphery of its cross-sectional shape include curvature or at least one substantially obtuse angle.

17 Claims, 9 Drawing Sheets

(56) References Cited

U.S. PATENT DOCUMENTS

| | | |
|---|---|---|
| 8,416,530 B2 | 4/2013 | Gao et al. |
| 8,416,647 B1 | 4/2013 | Zhao et al. |
| 2013/0148485 A1 | 6/2013 | Jin et al. |
| 2014/0251948 A1* | 9/2014 | Zhao et al. ............ 216/24 |
| 2014/0254336 A1* | 9/2014 | Jandric et al. ......... 369/13.33 |

* cited by examiner

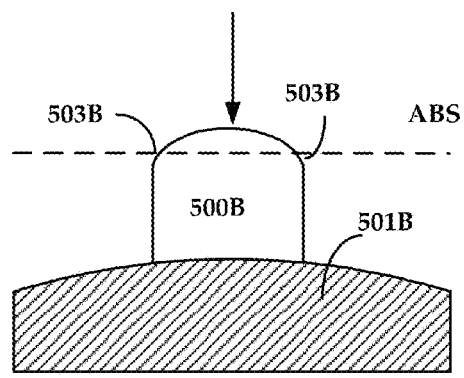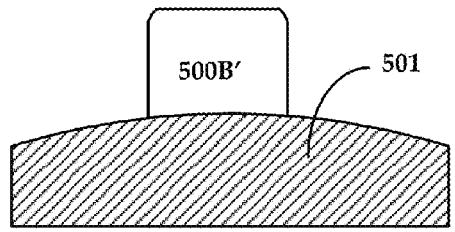
FIG. 5B  FIG. 5B′
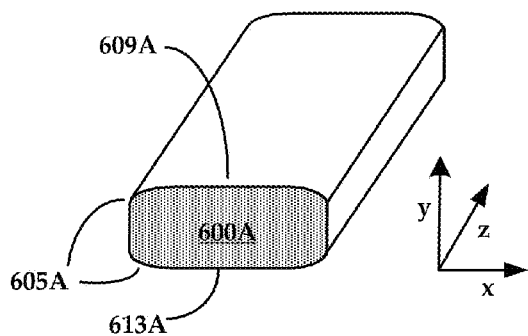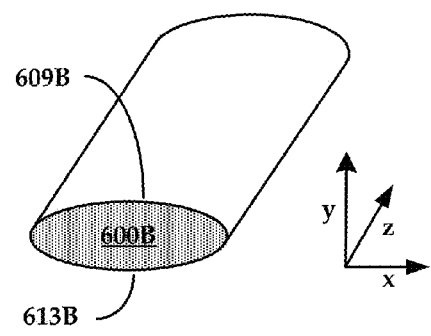
FIG. 6A  FIG. 6B

NEAR-FIELD TRANSDUCER WITH ROUNDED OR OBTUSE CORNERS

SUMMARY

Various embodiments include an apparatus that includes a waveguide and a plasmonic near-field transducer. The near-field transducer is positioned at or near an air-bearing surface and is operatively coupled to the waveguide. The near-field transducer includes an enlarged region and a peg region extending from the enlarged region towards the air-bearing surface. The peg region has a cross-sectional shape that includes curvature.

Additional embodiments include an apparatus that includes a waveguide and a plasmonic near-field transducer. The near-field transducer is positioned at or near an air-bearing surface and is operatively coupled to the waveguide. The near-field transducer includes an enlarged region and a peg region extending from the enlarged region towards the air-bearing surface. The peg region has a cross-sectional shape that includes at least one obtuse angle.

Other embodiments include a method of energizing an apparatus comprising an air-bearing surface configured to interact with a magnetic recording medium. The apparatus includes a waveguide and a plasmonic near-field transducer. The near-field transducer is positioned at or near the air-bearing surface and is operatively coupled to the waveguide. The near-field transducer includes an enlarged region and a peg region extending from the enlarged region. The peg region has a cross-sectional shape that includes curvature or at least one obtuse angle. The method further includes heating an area in a recording medium proximal to the air-bearing surface with sufficient energy from the apparatus to reduce the coercivity of the recording medium in that area to allow the recording media to align with an externally applied magnetic field.

The above summary is not intended to describe each disclosed embodiment or every implementation of the present disclosure. The figures and the detailed description below more particularly exemplify illustrative embodiments

BRIEF DESCRIPTION OF THE DRAWINGS

Throughout the specification reference is made to the appended drawings, where like reference numerals designate like elements, and wherein:

FIGS. 5B and 5B' are plan view diagrams of exemplary peg regions of near-field transducers with side structures having rounded angles before lapping (FIG. 5B) and after lapping (FIG. 5B').

FIGS. 6A and 6B are diagrams of views from the air-bearing surface of two other example embodiments of peg regions of near-field transducers that include curvature.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
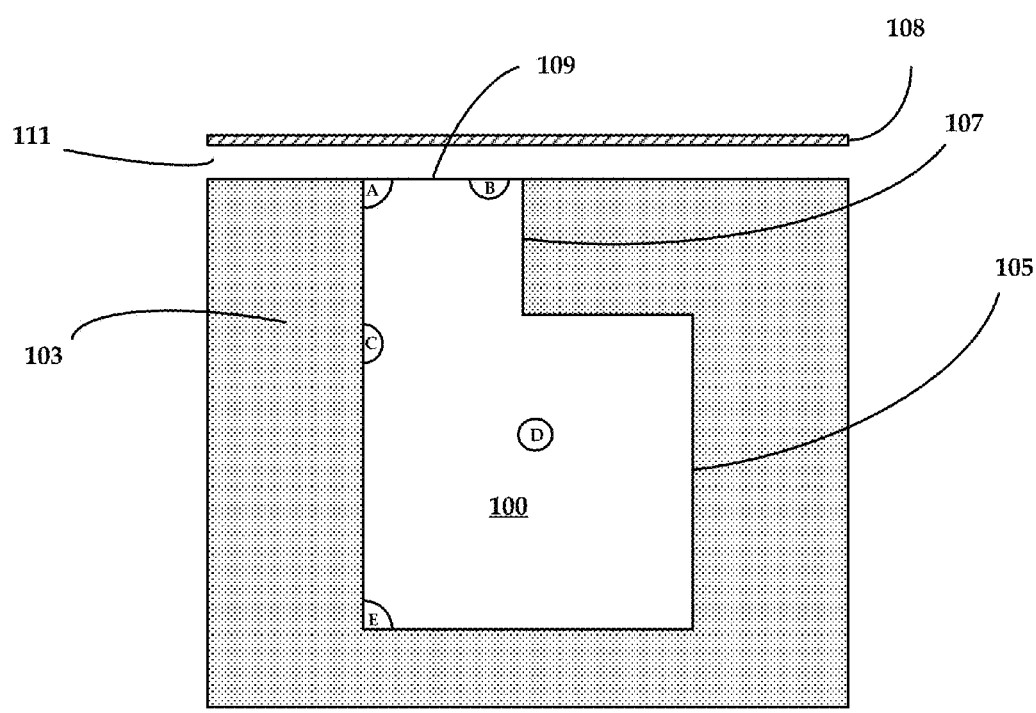
FIG. 1 is a general diagram of cross-section of a peg region of a lollipop near-field transducer in a plane perpendicular to the plane of the air-bearing surface.

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The present disclosure is generally directed to read-write heads used in magnetic recording devices such as hard drives. In particular, this disclosure relates to heat-assisted magnetic recording (HAMR), which can be used to increase areal data density of a magnetic medium. In a HAMR device, information bits are recorded in a storage layer at elevated temperatures in a specially configured magnetic medium. The use of heat can overcome superparamagnetic effects that might otherwise limit the areal data density of the medium. As such, HAMR devices may include magnetic write heads for delivering electromagnetic energy to heat a small confined medium area (spot size) at the same time the magnetic write head applies a magnetic field to the medium for recording.

One way to achieve a tiny confined hot spot can be to use an optical near-field transducer (NFT), such as a plasmonic optical antenna or an aperture, located at or near an air-bearing surface of a hard drive slider. Light may be launched from a light source (e.g., a laser diode) into optics integrated into a slider. An example of such integrated optics includes a waveguide formed from core and cladding layers with high contrast between respective refractive indices. Light propagating in the waveguide may be operatively coupled into the NFT. The NFT can focus energy from the waveguide to a very small spot on the recording medium.

Various embodiments disclosed herein are generally directed to apparatuses and methods that include a plasmonic near-field transducer for heat-assisted magnetic recording (HAMR). Near-field transducers (NFTs) used in read/write heads for HAMR can include an enlarged region and a peg region extending from the enlarged region. These "lollipop" plasmonic near-field transducers can have limited lifetimes due to peg recession (erosion of the peg tip or end nearest the air-bearing surface). Example embodiments of lollipop plasmonic near-field transducers can have an enlarged region that has a width or diameter of from about 200 nm to about 300 nm. Generally, peg regions of lollipop near-field transducers have widths in the 30 nm to 60 nm range and have rectangular cross-sections to achieve sharp and flat cross-track transitions. The peg region can have a length of from about 5 nm to about 35 nm. The corners of pegs with rectangular cross-sections can be locations where deformation and ultimately peg recession can be initiated. In the present disclosure, "rectangular corners" refers to two adjacent sides of a peg that have a polygonal cross-section that meet at any well-defined substantially acute or right angle. Energetically, void formation can occur first at these corners due to stress gradients. In some embodiments, apparatuses and methods are disclosed that are directed to NFTs that have peg regions having at least a portion of a periphery of their cross-sectional shape contain curvature. In some other embodiments, apparatuses and methods are disclosed that are directed to NFTs that have peg regions having at least a portion of a periphery of their cross-sectional shape contain at least one obtuse angle.

FIG. 1 is a general diagram of cross-section of a peg region of a lollipop near-field transducer. Near-field transducer 100 includes enlarged region 105 and peg region 107. Peg region 107 is adjacent to recording media 108 separated by air-bearing 111 as shown in FIG. 1. Peg region 100 has air-bearing surface 109 adjacent to air-bearing 111. Near-field transducer 100 can be made or coated with a plasmonic metal such as gold, silver, copper, or a combination thereof and is surrounded by cladding 103. FIG. 1 shows some labeled positions (A-E) where voids can be initiated. An analytical study of void formation (nucleation) in the locations shown on the near-field transducer shown in FIG. 1 based upon surface energy, strain energy, and vacancy concentration contributions was performed using modeling. With cladding 103 being $Al_2O_3$ or $SiO_2$, corner "A" was determined to be the most energetically favorable location for initiation of a void based upon overall reduction in system energy. Voiding at corners such as corner "A" is made worse with sharper corner angles (smaller, more acute angles). Peg structures having at least a portion of a periphery of their cross-sectional shape that includes curvature may be useful for reducing void nucleation sites and therefore increasing peg lifetimes. In some embodiments, the periphery of their cross-sectional shape can be in a plane parallel to the air-bearing surface. Additionally, peg regions having a periphery of their cross-sectional shape that contain at least one obtuse angle may be useful for this same purpose. For the purposes of the present disclosure, "obtuse angle" is an angle that is substantially larger than 90 degrees. Such angles can be greater than about 95 degrees, greater than about 100 degrees, greater than about 120 degrees, or even greater than about 150 degrees. Peg regions having a periphery of their cross-sectional shape include at least one obtuse angle can reduce void formation and subsequent peg recession compared to a peg region having a 90 degree or slightly larger (obtuse) angle.

Figure 2:
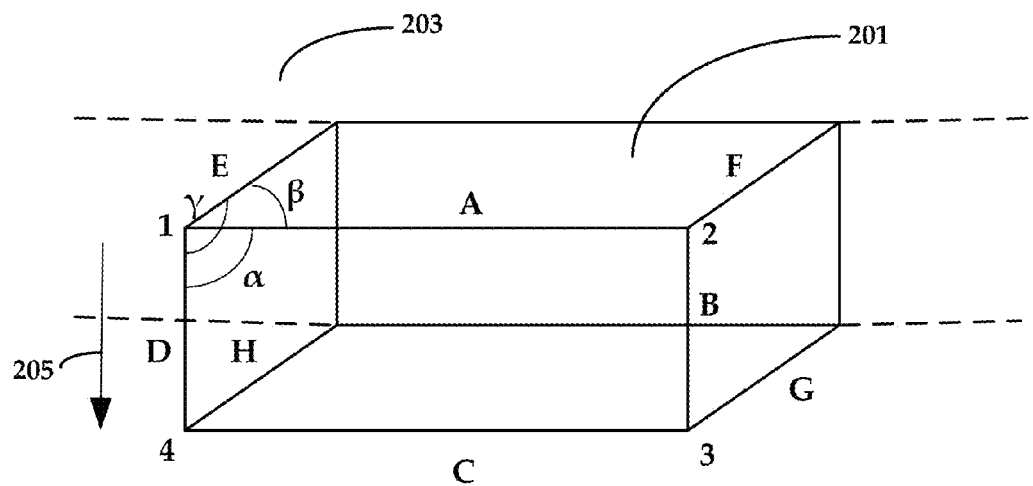
FIG. 2 is a schematic diagram of a generalized near-field transducer structure with edges and angles identified.

FIG. 2 is a schematic diagram of a generalized near-field transducer structure with edges and angles identified. Corners 1-4 are described by their constituent edges (e.g., A-D) and angles ($\alpha$, $\beta$, $\gamma$). Peg region 201 is shown protruding from enlarged region 203. Recording media (not shown) is parallel to and out of the plane of face ABCD. A recording medium is moving past peg region 201 in the direction shown by arrow 205. Edge A is the leading edge of the peg region and edge C the trailing edge of the peg region as defined by the direction of the movement of the recording medium. This generalized near-field transducer structure is provided only as a guide for indicating and locating structures on the disclosed near-field transducers. The disclosed near-field transducers have curvature that includes rounded corners (at, for example, locations 1, 2, 3, or 4) or have at least one angle $\alpha$, $\beta$, and/or $\gamma$ that is obtuse (greater than 90 degrees). The peg region designs disclosed herein aim to effect increases in the corner angles of peg regions, in most cases rounded or greater than 90 degrees, using existing or novel wafer process methods.

Embodiments are directed to an apparatus for magnetic recording having an air-bearing surface configured to interact with a magnetic recording medium. The embodied apparatus includes a waveguide and a plasmonic near-field transducer positioned at or near the air-bearing surface. The plasmonic near-field transducer can be operatively coupled to the waveguide and can include an enlarged region and a peg region. The peg region can extend from the enlarged region towards the air-bearing surface and can have at least a portion of a periphery of its cross-sectional include curvature. In some embodiments, the periphery of the cross-sectional shape of the peg region can include curvature at a leading edge of the peg region. In some other embodiments, the periphery of the cross-sectional shape of the peg region can include curvature at the trailing edge of the peg region. In other embodiments, the periphery of the cross-sectional shape of the peg region can include curvature at both the leading edge and the trailing edge. In some embodiments, the periphery of the cross-sectional shape of the peg region can include at least one rounded corner. The rounded corner can be on the leading edge of the peg region or on the trailing edge of the peg region. In other embodiments, the periphery of the cross-sectional shape of the peg region can include at least two rounded corners.

In some embodiments, the periphery of the cross-sectional shape of the peg region can define a polygon (triangle, square, rectangle, pentagon, hexagon, for example) that has at least two rounded corners. In some other embodiments, the periphery of the cross-sectional shape of the peg region can include at least three rounded corners or more. The periphery of the cross-sectional shape of the peg region can be derived from a regular polygon (all sides are of equal length and all angles between the sides are the same) or can derived from an irregular polygon (not all sides and/or angles between the sides are the same). In some embodiments, the cross-sectional shape of the peg region can include curvature, but no corner angles, and can be circular, elliptical, or otherwise rounded.

In some embodiments, the disclosed apparatus includes a near-field transducer having a peg region that has enough curvature on the periphery of its trailing or leading edge to reduce void formation at the curvature relative to a peg region having a periphery of a cross section that can be rectangular or has substantially right or acute angles. In some embodiments, at least a majority of the periphery of the cross-sectional shape can be continuously curved. The continuous curvature can be convex or concave or a combination thereof. By continuously curved it is meant that there are substantially no linear portions on the periphery of the cross-section. Examples of some of these embodiments are shown in the figures described herein. But the exemplary embodiments are not meant in any way to limit the disclosed peg regions.

Additional embodiments include an apparatus where the near-field transducer includes an enlarged region and a peg region extending from the enlarged region towards the air-bearing surface that has a periphery of a cross-sectional shape that includes at least one obtuse angle. In some embodiments, the periphery of the cross-sectional shape can be in a plane parallel to the air-bearing surface. In some embodiments, the obtuse angle can be located at or on the leading edge of the peg region. In other embodiments, the obtuse angle can be located at the trailing edge of the peg region. The obtuse angle can be located at angle α, β, or γ with reference to FIG. 2 and can be at a corner at the leading edge (e.g., corners 1 or 2 in FIG. 2) or at the trailing edge (e.g., corners 3 or 4 in FIG. 2).

Figure 3:
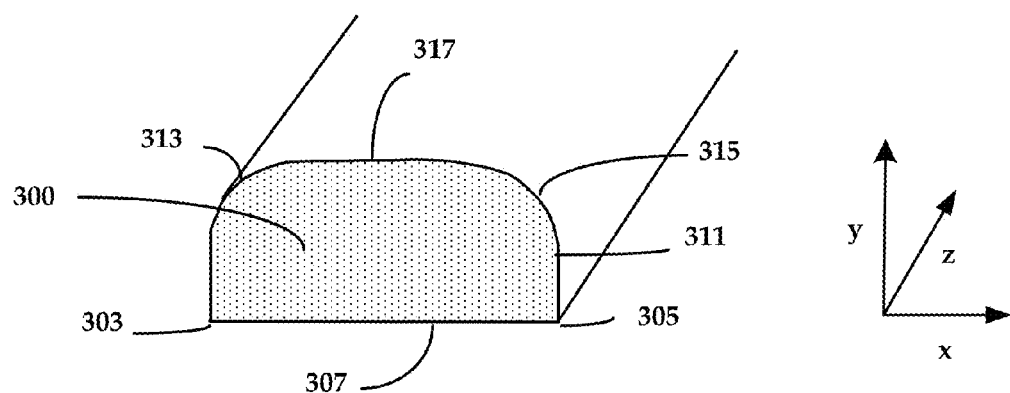
FIG. 3 is a diagram of a view from the air-bearing surface of an example embodiment of a peg region of a near-field transducer that includes curvature.

FIG. 3 is a diagram of a view from the air-bearing surface of an example embodiment of a peg region of a near-field transducer having a periphery of a cross-section that has two rounded corners at the trailing edge of the peg region. Cross-section 300 of the peg region of an embodied near-field transducer includes two rectangular corners, 303 and 305, at leading edge 307 of the peg region. For reference, the recording media (not shown) is moving relative to cross-section 300 in the y-direction of the arrow. Two rounded corners, 313 and 315 are at trailing edge 317 of the peg region (opposite the leading edge). The radius of curvature of rounded corners 313 and 315 can be large enough to stabilize the corner structure without creating unduly large disturbances in the flatness of the overall peg trailing edge (top) 317 or peg side 311. The enlarged region of the near-field transducer (not illustrated) is located somewhere behind the plane of the paper along the z-direction.

The structure shown in FIG. 3 can be made using a low-temperature wafer-level annealing to thermally deform the peg after milling. Other sources of thermal energy such as radiant heating can also be used. Another method of making the structure shown in FIG. 3 can use a hard mask layer for dry etching of the peg region. The mask can be thin enough to erode the peg region at the edges during milling. Subsequent exposure of the peg edges can cause the top corners to be eroded, resulting in a rounded structure.

Table 1 shows the results of a bar level thermal anneal recession test performed on example embodiments of peg regions of disclosed near-field transducers. Bars were sliced from different wafers which had different experimental seed layers, dielectric claddings, or peg formation technique (sputtered peg or electrodeposited peg). An ABS CD-SEM (scanning electron microscope with a charge coupled device at the air-bearing surface plane) was used to image the ABS surface for all the heads (approximately 58 heads) on a bar before any annealing of the pegs took place (as-lapped condition). One set of bars went through an isothermal anneal (300° C. for 30 minutes in an oven) and a different set of bars went through an isothermal anneal (400° C. for 30 minutes in an oven). The bars were then re-imaged in the ABS CD-SEM. Images were carefully inspected to detect peg recession or peg rounding. Any peg recession or peg rounding was counted as a failure. Table 1 displays the failure rate (percentage of failed pegs) versus the peg material. Over-ashed bars with rounded pegs performed better than square pegs.

TABLE 1

| Bar-level Recession Test Results (Percent Failure) | | | |
|---|---|---|---|
| Peg Material | Peg Underlayer | Anneal 300° C./30 Min | Anneal 400° C./30 Min |
| gold over Zr Seed | PECVD SiO$_2$ | 12 | 83 |
| gold over Zr Seed/cap | PECVD SiO$_2$ | 35 | 86 |
| gold over ZrN Seed | PECVD SiO$_2$ | 5 | 43 |
| ED gold | PECVD SiO$_2$ | 22 | 90 |
| ED gold | PECVD SiO$_2$ | 33 | 90 |
| gold over Zr Seed | PEALD SiO$_2$ | 28 | 82 |
| gold over Zr Seed (over-ashed) | PEALD SiO$_2$ | 0 | 17 |
| gold over Zr seed over-ashed | PEALD SiO$_2$ | 6 | 67 |

Peg Material

"Zr Seed" refers to a peg region covered with sputtered gold over a zirconium seed layer;

"Zr Seed/cap" refers to a peg region covered with sputtered gold over a zirconium seed layer with a cap layer of zirconium over the tip of the peg region;

"ZrN Seed" refers to a peg region covered sputtered gold over a zirconium nitride seed layer;

"ED gold" refers to a peg region electrodeposited gold;

Underlayer

"PEALD SiO$_2$" refers to regions under the peg (underlayer) made from plasma-enhanced atomic layer deposited SiO$_2$.

"PECVD SiO$_2$" refers to regions under the peg (underlayer) made from plasma-enhanced chemical vapor deposited SiO$_2$.

"over-ashed" refers to peg overcoats that were accidently processed at twice the time of the ashing time used for the other peg overcoats. "Ashing" refers to the process of using an oxygen plasma to remove organic material from the SiO$_2$.

The results in Table 1 show that the use of a seed layer such as zirconium or zirconium nitride improves (lowers) the peg failure rate in the peg recession test. Additionally, over-ashing of the peg showed significant improvement in the peg recession test (less recession or erosion) than standard pegs (not over-ashed). Peg regions with an underlayer made from PECVD SiO$_2$, when over-ashed perform better in the peg recession test than peg regions with an underlayer made from PEALD SiO$_2$.

During standard peg processing of the peg embodiments tested in Table 1, a hard mask made of amorphous carbon (a-C) was ashed away with an ash tool. The two wafers (labeled "over-ashed") were misprocessed and were ashed twice as long as the other wafers. The over-ashing caused rounding of the corners of peg, as was observed in TEM images. Experiments were performed that showed correlation between ashing time and extent of peg rounding. These two wafers were processed further since modeling showed that peg rounding can improve peg performance. The peg performance produced by over-ashing was greater than expected.

Figure 4:
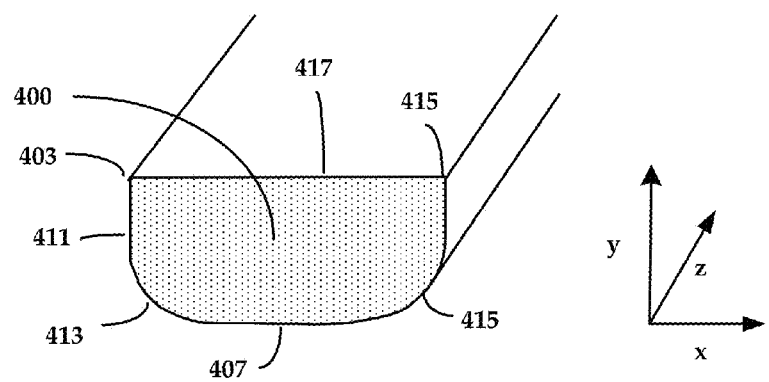
FIG. 4 is a diagram of a view from the air-bearing surface of a different example embodiment of a peg region of a near-field transducer that includes curvature.

FIG. 4 is a diagram of a view from the air-bearing surface of another example embodiment of a peg region of a near-field transducer having a periphery of a cross-section that has two rounded corners at the leading edge of the peg region. Cross-section 400 of the peg region of an embodied near-field transducer includes two rectangular corners, 403 and 405, at trailing edge 417 of the peg region. For reference, the recording media (not shown) is moving relative to cross-section 400 in the y-direction of the arrow. Two rounded corners, 413 and 415 are at leading edge 407 of the peg region. The radius of curvature of rounded corners 413 and 415 can be large enough to stabilize the corner structure without creating unduly large disturbances in the flatness of the overall peg trailing edge 417 or peg side 411. The enlarged region of the near-field transducer (not illustrated) is located behind the plane of the illustration along the z-direction.

The structure shown in FIG. 4 can be made using a Damascene-style peg fabrication method. In this method, a trench can be edged into a dielectric followed by peg metal deposition and chemical mechanical planarization (CMP). The shape at the leading edge can be controlled using etch angle, resist wall separation, resist height, or any other process that can control etch shadowing and can produce rounded corner shapes. An alternative method can include an isotropic wet etch to produce a non-sharp (rounded) cornered shape. The final shape can range from orthogonal with corner radii to semi-circular to semi-elliptical to V-groove depending upon the process conditions.

Figure 5A:
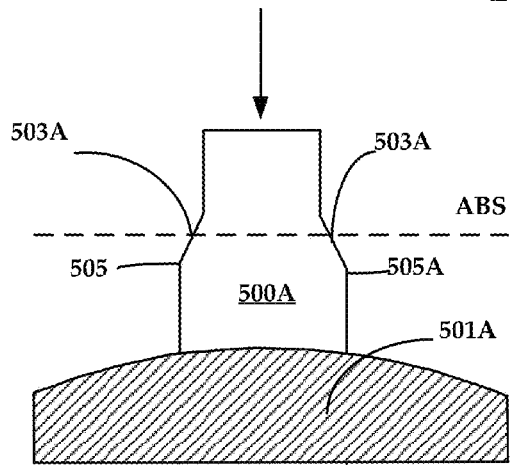
FIGS. 5A and 5A' are plan view diagrams of example embodiments of peg regions of near-field transducers with tapered side structures having obtuse angles before lapping (FIG. 5A) and after lapping (FIG. 5A').
Figure 5A:
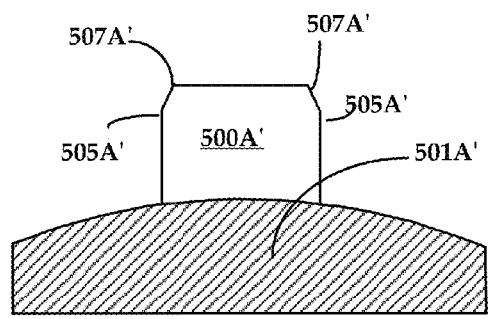

FIGS. 5A and 5A' are plan view diagrams of exemplary peg regions of near-field transducers with tapered side structures having obtuse angles before lapping (FIG. 5A) and after lapping to the air-bearing surface (ABS-FIG. 5A'). FIG. 5A shows a precursor of an example embodiment for a peg region having a tapered peg side structure. The embodied peg region that includes an angle of greater than 90 degrees at all four corners (β angles in FIG. 2) that intercept the air-bearing surface (ABS). In FIG. 5A precursor 500A of peg region 500A', the embodied peg region is disposed upon enlarged region 501A and features tapered sides 503A that form at least one obtuse angle 505A near the end of peg region precursor 500A. During processing, peg region precursor 500A can be lapped from its tip in the direction of the arrow until the tip is at the air-bearing surface (ABS). FIG. 5A' is an illustration of the final peg after lapping that has a periphery of its cross-sectional shape comprise an obtuse angle. FIG. 5A' includes enlarged region 501A' and peg region 500A'. Peg region 500N includes obtuse angles 505A' and 507A'. With reference to FIG. 2, the obtuse angle(s) are angles β and γ when viewed from the ABS.

FIGS. 5B and 5B' are plan view diagrams of exemplary peg regions of near-field transducers with side structures having rounded angles before lapping (FIG. 5B) and after lapping (FIG. 5B'). The example embodiment shown in FIG. 5B shows precursor peg region 500B in contact with enlarged region 501B. Peg precursor has rounded angles 503B. FIG. 5B' shows peg region 500B' of precursor peg region 500B after it has been lapped in the direction of the arrow to the ABS. The resultant peg region 500B' has a flat top with a rounded top (curvature in the β and γ angles of FIG. 2).

Near-field transducers with tapered or rounded peg side structures as shown in FIGS. 5A and 5B can be fabricated by modification of an etch mask during milling in the region where the peg intercepts the air-bearing surface. Other options including patterning and post-trimming to create tapered or rounded peg side structure features can create these structures due to peg widths of around 50 nm and the peg lengths of about 5 nm to 10 nm. Post-trimming can include etching or lapping using abrasive materials.

Disclosed embodiments can include peg regions that have a combination of rounded tops and rounded bottoms. In these embodiments, peg cross-sectional shapes may deviate from shapes having nominally orthogonal sides. FIG. 6A is a diagram of a view from the air-bearing surface of an embodiment of a cross-section of a peg region 600A that has four rounded corners 605A and flat areas between the rounded corners. Cross-section of peg region 600A includes rounded corners 605A as shown in FIG. 6A. Leading edge 613A (the y-arrow indicates direction of the movement of recording media (not shown) in relation to the illustrated peg region) has a flat side as does trailing edge 609A. There is also a flat side region on each lateral side of the peg region.

FIG. 6B is a diagram of a view from the air-bearing surface of an embodied peg region that is completely rounded and that lacks distinct rounded corners. Cross-section 600B has a periphery that includes a continuously curved shape. Both leading edge 613B and trailing edge 609B are curved (based upon the recording media (not shown)) moving in the direction of the y-arrow. There are substantially no flat side regions in this example embodiment of a disclosed peg region.

Figure 7:
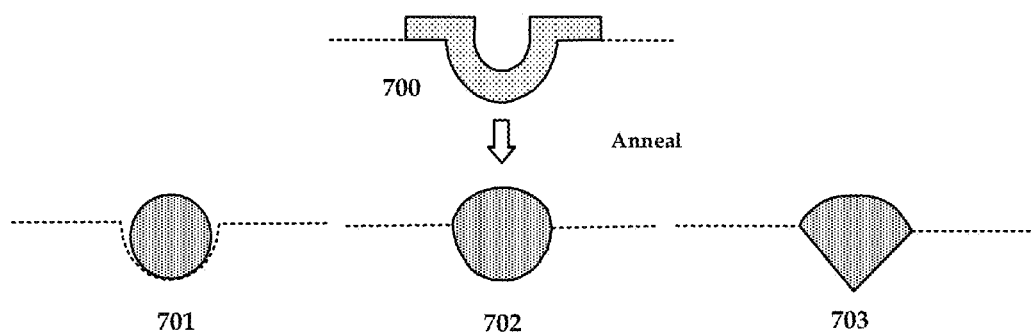
FIG. 7 is a diagram of a template dewetting approach for forming non-rectangular cross-sections of peg regions of embodied near-field transducers.

Structures such as those embodied in FIGS. 6A and 6B may be fabricated by using a combination of the methods described above. In addition, a Damascene approach using a two-layer dielectric can be used as follows. Following chemical mechanical planarization (CMP) the top dielectric can be removed to expose the top portion of the peg. Thermal annealing can then round the sides to produce a fully rounded corner structure such as that shown in FIG. 6B. Another useful fabrication method can use templated dewetting. A patterned path of metal can be deposited over an etched trench of semicircular, semi-elliptical, or V-groove cross-section as shown in 700 of FIG. 7. Subsequently, high temperature annealing causes the peg material (plasmonic material such as, for example, gold) to dewet and, driven by capillary forces, to accumulate along the length of the trench or groove forming structures that are essentially nanorods with short lengths and continuously curved peripheries. Trench 701 is circular. The radius of curvature of the annealed peg material due to capillary forces has a smaller radius than the circular trench. Trench 702 is an illustration of a semi-elliptical trench having a radius of curvature much closer to that of the annealed peg material. Trench 703 is a V-groove showing, in this illustrated embodiment, annealed peg material conforming to the V-groove. Other materials and other shapes of the etched trench can produce other cross-sectional shapes of peg regions.

Figure 8A:
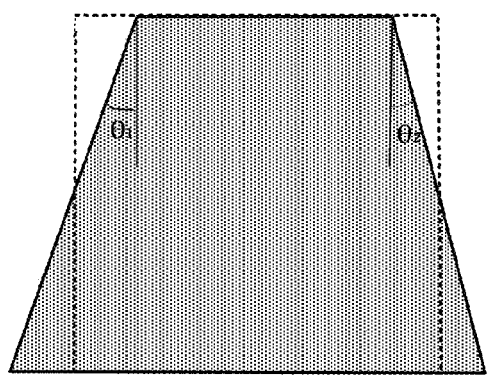
FIGS. 8A and 8B are pictorial descriptions of peg cross-sectional geometries viewed from the air-bearing surface that are used for modeling the results of which are displayed in FIGS. 9A-9L.
Figure 8B:
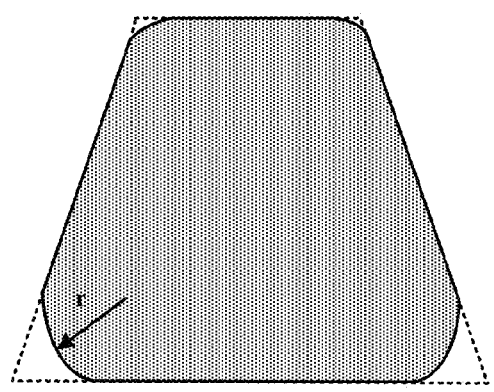
Figure 9A:
FIGS. 9A-9L are finite-difference time-domain (FDTD) analysis maps of power dissipation of the various peg cross-sectional geometries shown in FIGS. 8A and 8B.
Figure 9B:
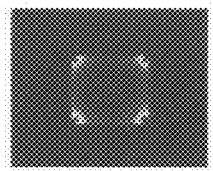

Thermo-optical finite-element modeling was performed to demonstrate the effect of high energy absorption in sharp corners of peg regions. For the modeling, two peg cross-sectional geometries were used. FIGS. 8A and 8B are pictorial descriptions of peg cross-sectional geometries used for modeling the results of which are displayed in FIGS. 9A-9L. FIG. 9A is an illustration of a theoretical peg region having a trapezoidal cross-section with sides deviating from rectangular geometry by angles θ as shown. FIG. 9B is an illustration of a theoretical peg region forming a rounded trapezoid with bottom corners having a curvature of radius "r".

The effect of geometry (in particular, corner rounding) in power dissipation based upon thermo-optical modeling is shown illustrated in FIGS. 9A-9L and Table 2 below. Table 2 displays the θ and r values for FIGS. 9A-9L.

TABLE 2

Power Dissipation Map

Figure 9C:
Figure 9D:
Figure 9E:
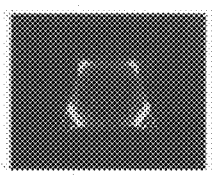
Figure 9F:
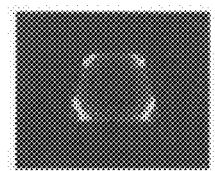
Figure 9G:
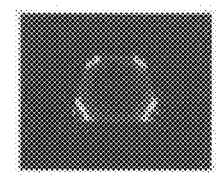
Figure 9H:
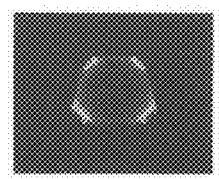
Figure 9I:
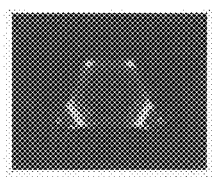
Figure 9J:
Figure 9K:
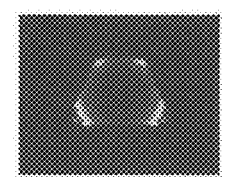
Figure 9L:

| r | 0 nm | 3 nm | 6 nm | 9 nm |
|---|------|------|------|------|
| θ = 0° | FIG. 9A | FIG. 9B | FIG. 9C | FIG. 9D |
| θ = 16° | FIG. 9E | FIG. 9F | FIG. 9G | FIG. 9H |
| θ = 24° | FIG. 9I | FIG. 9J | FIG. 9K | FIG. 9L |

Modeling of peg regions that have sharp corners (large θ and small "r") have the highest power absorption (for example, FIGS. 9E, 9I, and 9J). Peg regions that have rounded corners (small θ and large "r") have the least power absorption (for example, FIGS. 9C, 9D and 9H).

Figure 10A:
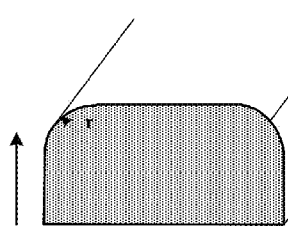
FIGS. 10A-10C are example embodiments of top down views from the air-bearing surface of peg cross-sectional geometries for rectangular pegs the include curvature.
Figure 10B:
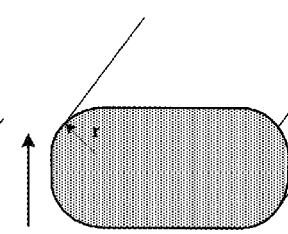
Figure 10C:
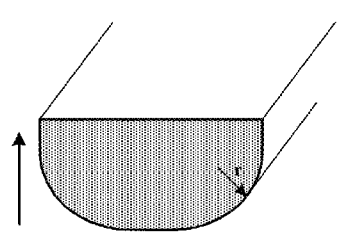

FIGS. 10A-10C are example embodiments of peg cross-sectional geometries for rounded rectangular pegs modeled using thermo-optical modeling. FIG. 10A is an illustration of a peg region cross-section that has two rounded corners on the trailing edge. FIG. 10B is an illustration of a peg region cross-section that has four rounded corners and flat sides. FIG. 10C is an illustration of a peg region cross-section that has two rounded corners on the leading edge. All of the rounded corners for the peg region cross-sections used in the modeling had a radius of curvature of "r".

The thermo-optical modeling results are shown in FIGS. 11A-11E. The responses of near-field transducers having three different peg designs (shown in FIGS. 10A-10C) are graphed. The legend shown in FIG. 11A pertains to all of FIGS. 11A-11E. "10A (trailing)" refers to a peg region of a near-field transducer (see FIG. 10A), as viewed from the air-bearing surface, having a periphery that has a cross-sectional shape in a plane parallel to the air-bearing surface that has rounded corners at the trailing edges (arrow indicates media direction relative to the peg end as viewed from the air-bearing surface). "10B (all)" refers to a peg region of a near-field transducer (see FIG. 10B), as viewed from the air-bearing surface, having a periphery that has a cross-sectional shape in a plane parallel to the air-bearing surface that has rounded corners at both the leading edges and the trailing edges. "10C (leading)" refers to a peg region of a near-field transducer (see FIG. 10C), as viewed from the air-bearing surface, having a periphery that has a cross sectional shape in a plane parallel to the air-bearing surface that has rounded corners at the leading edges of the peg region.

Figure 11A:
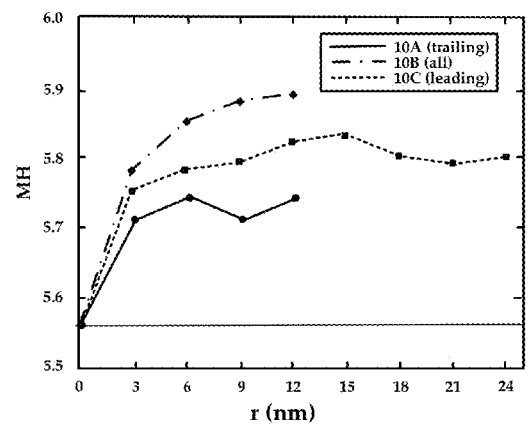
FIGS. 11A-11E are graphs of results of thermo-optical modeling for the three example embodiments of peg regions illustrated in FIGS. 10A-10-C.

FIG. 11A is a graph of the ratio of the media temperature change over the head temperature change ("MH") in milliwatts as a function of "r" (radius of curvature as shown in FIGS. 10A-10C). The results show that peg regions with a cross-sectional shape in a plane parallel to the air-bearing surface that has rounded corners at the leading edge heats the media more than peg regions having rounded corners at the trailing edge. Peg regions with rounded corners at both the leading and trailing edges (and thus, no sharp rectangular angles) are the most efficient at heating the recording media. Additionally, greater roundness (higher "r" values up to about 12 nm) increases temperature ratio of media to head which is desirable for improving reliability.

Figure 11B:
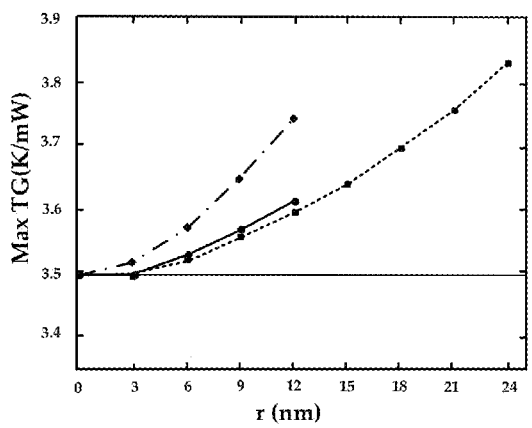

FIG. 11B is a graph of the modeling results showing the maximum temperature gradient in the recording media ("Max TG (K/mW)") as a function of "r". Here, a higher value is better for heat-assisted magnetic recording since increasing the Max TG value increases the thermal gradient resulting in a sharper spot size. The results in FIG. 11B show that peg regions having a cross-sectional shape in a plane parallel to the air-bearing surface that has rounded corners at the trailing edge have a higher MAX TG as the radius "r" increases compared to peg regions that have a cross-sectional shape in a plane parallel to the air-bearing surface that has rounded corners at the leading edge or at the leading edges and the trailing edges.

Figure 11C:
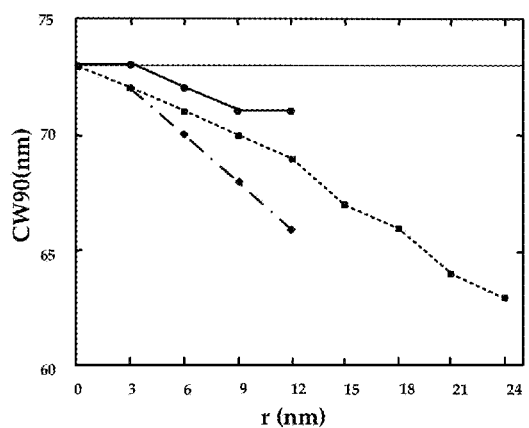
Figure 11D:
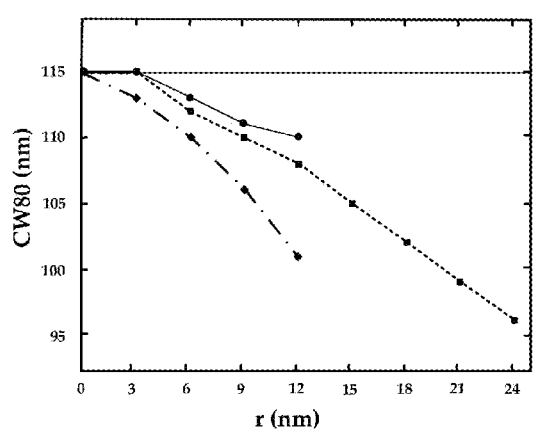

FIGS. 11C and 11D are graphs of the modeling results with a response being the cross-track width at 90% peak temperature of the media ("CW90 (nm)") and the cross-track width at 80% peak temperature of the media ("CW80 (nm)") as a function of "r". FIGS. 11C and 11D show that cross-track width of the recording spot on the media decreases more rapidly with a peg region having a cross-sectional shape in a plane parallel to the air-bearing surface that has rounded corners at the leading edge than anywhere else.

Figure 11E:
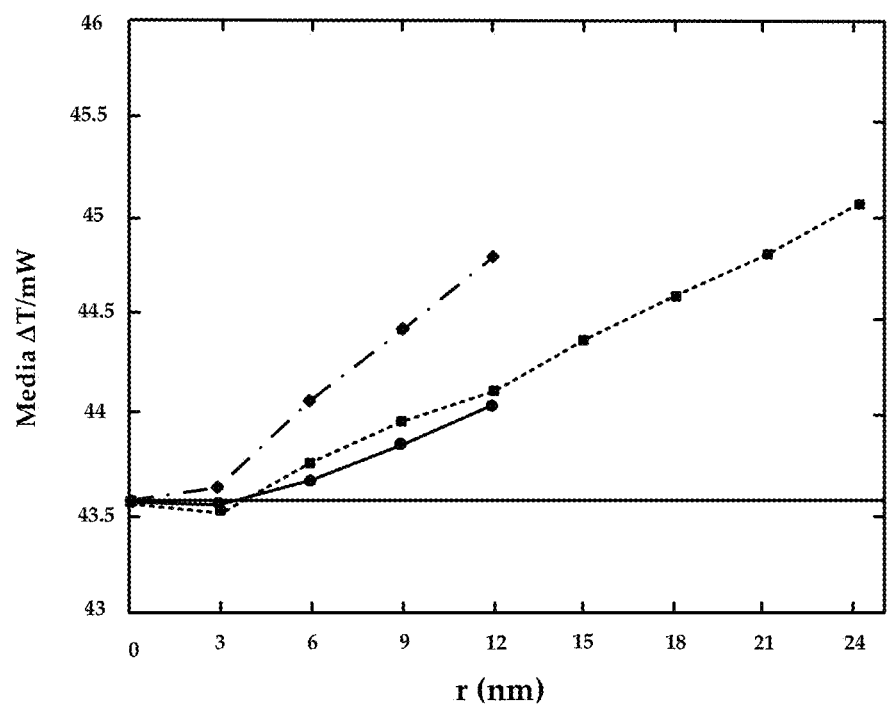

FIG. 11E is a graph of the modeling results with a response being the change in temperature of the recording media ("Media ΔT/mW") as a function of "r". The results show that peg regions that have rounded corners on the leading edge cause more efficient heating than the other two configurations. The results of FIGS. 11A-11E also show that more roundness (higher "r") enhances the all of the responses.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An apparatus comprising:
   a waveguide; and
   a plasmonic near-field transducer positioned at or near an air-bearing surface and operatively coupled to the waveguide, the near-field transducer comprising:
      an enlarged region; and
      a peg region extending from the enlarged region towards the air-bearing surface, the peg region having at least a portion of a periphery of its cross-sectional shape having at least one rounded corner.

2. An apparatus according to claim 1, wherein the periphery of the cross-sectional shape of the peg region comprises curvature at a leading edge of the peg region.

3. An apparatus according to claim 1, wherein the periphery of the cross-sectional shape of the peg region comprises at least two rounded corners.

4. The apparatus of claim 1, wherein the periphery of the cross-sectional shape of the peg region defines a polygon comprising at least two rounded corners at a leading edge of the peg region.

5. The apparatus of claim 1, wherein the periphery of the cross-sectional shape of the peg region defines a polygon comprising at least two rounded corners at a trailing edge of the peg region.

6. The apparatus of claim 1, wherein the periphery of the cross-sectional shape of the peg region defines a polygon comprising at least three rounded corners.

7. The apparatus of claim 1, wherein the periphery of the cross-sectional shape comprises at least two rounded corners having a radius of curvature that reduces void formation at the rounded corners relative to a peg region having a rectangular cross-section.

8. The apparatus of claim 2, wherein at least a majority of the periphery of its cross-sectional shape in a plane parallel to the air-bearing surface comprises a continuously curved shape.

9. The apparatus of claim 8, wherein an entirety of the periphery of its cross-sectional shape in a plane parallel to the air-bearing surface comprises a continuously curved shape.

10. An apparatus comprising:
a waveguide; and
a plasmonic near-field transducer positioned at or near an air-bearing surface and operatively coupled to the waveguide, the near-field transducer comprising:
an enlarged region; and
a peg region extending from the enlarged region towards the air-bearing surface, the peg region having a periphery of its cross-sectional shape comprising an obtuse angle, the peg region comprising:
a straight peg portion extending from the enlarged region towards the air-bearing surface; and
a tapered peg portion extending from the straight peg region towards the air bearing surface.

11. An apparatus according to claim 10, wherein the obtuse angle is located at a leading edge of the peg region.

12. An apparatus according to claim 10, wherein the obtuse angle is located at a trailing edge of the peg region.

13. The apparatus of claim 10, wherein the obtuse angle significantly reduces void formation to the peg region having a rectangular cross-section in a plane parallel to the air-bearing surface.

14. A method comprising:
energizing an apparatus comprising an air-bearing surface configured to interact with a magnetic recording medium, the apparatus comprising:
a waveguide; and
a plasmonic near-field transducer positioned at or near the air-bearing surface and optically coupled to the waveguide, the near-field transducer comprising:
an enlarged region; and
a peg region extending from the enlarged region, the peg region having a periphery of a cross-sectional shape that includes at least one rounded corner; and
heating an area in a recording medium proximal to the air-bearing surface with sufficient energy from the apparatus to reduce the coercivity of the recording media in that area to allow the recording medium to align with an externally applied magnetic field.

15. A method according to claim 14, wherein the at least two rounded corners or at least one obtuse angle on the periphery of a cross-sectional shape is on a leading edge of the peg region.

16. A method according to claim 14, wherein the at least two rounded corners or at least one obtuse angle on the periphery of a cross-sectional shape is on a trailing edge of the peg region.

17. The apparatus of claim 10, wherein the obtuse angle is located at an interface of the straight peg portion and the tapered peg portion.

* * * * *